United States Patent [19]

Iwai et al.

[11] 4,196,178

[45] Apr. 1, 1980

[54] PROCESS FOR PRODUCING METALLIC NITRIDE POWDER

[75] Inventors: Tadashi Iwai; Takashi Kawahito, both of Ube; Tetsuo Yamada, Settsu, all of Japan

[73] Assignee: Ube Industries, Ltd., Yamaguchi, Japan

[21] Appl. No.: 27,879

[22] Filed: Apr. 6, 1979

[30] Foreign Application Priority Data

May 8, 1978 [JP] Japan ................................. 53-53713

[51] Int. Cl.$^2$ ............................................. C01B 21/06
[52] U.S. Cl. .................................. 423/290; 423/344; 423/406; 423/409; 423/411; 423/413
[58] Field of Search ............... 423/290, 344, 406, 409, 423/411, 412, 413

[56] References Cited

U.S. PATENT DOCUMENTS

| | | | |
|---|---|---|---|
| 2,207,791 | 7/1940 | Fernelius | 423/406 |
| 3,032,397 | 5/1962 | Niederhauser | 423/409 |
| 3,591,338 | 7/1971 | Roberts | 423/411 |
| 3,959,446 | 5/1976 | Mazdiyasni et al. | 423/344 |

OTHER PUBLICATIONS

Glemser et al., "Zeitschrift fur Anorganische und Allgemeine Chemie" Band 298, 1959, pp. 134–141.
Billy, "Annules de Chimie", 1959, p. 818.

*Primary Examiner*—Jack Cooper
*Attorney, Agent, or Firm*—Miller & Prestia

[57] ABSTRACT

Fine metallic nitride powders having a high purity are prepared, without causing any plugging or other problems in the reaction apparatus and with easy heat control of the reaction, by reacting a metallic halide with liquid ammonia in the presence of an organic solvent which has a specific gravity higher than that of liquid ammonia, and also is not miscible or is only slightly miscible with liquid ammonia at a reaction temperature. The process according to the present invention is effected by introducing the metallic halide into the lower organic solvent layer of the reaction system.

5 Claims, 1 Drawing Figure

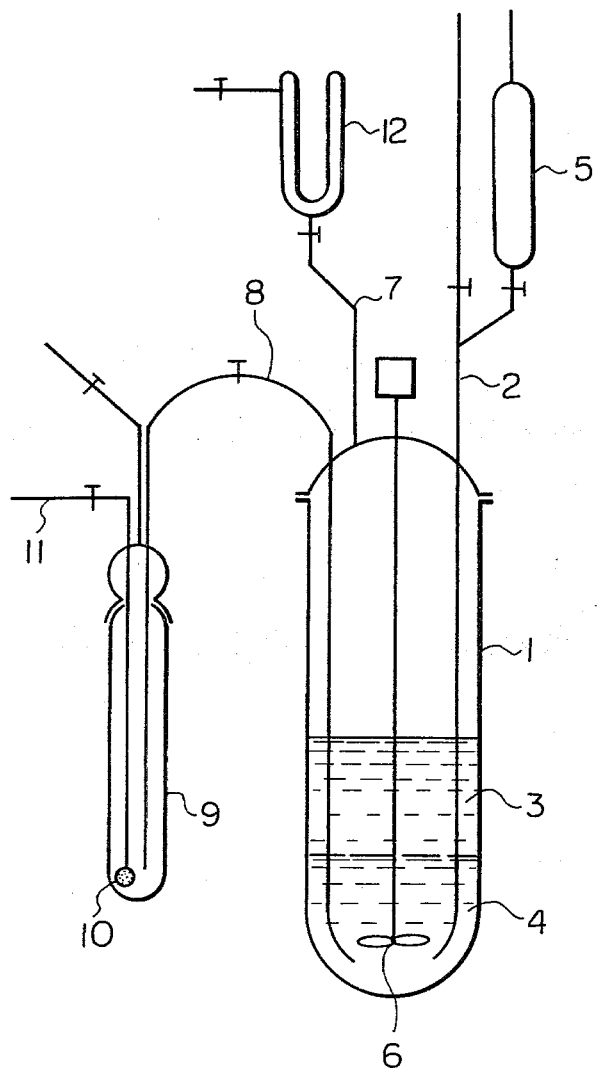

PROCESS FOR PRODUCING METALLIC NITRIDE POWDER

The present invention relates to a process for producing metallic nitride powder suitable for use in the manufacture of sintered metallic nitride which is useful as a super hard heat resisting material.

Sintered nitrides of metals such as silicon, boron, titanium and the like, have generated remarkable interest recently as super hard heat resisting materials. However, in order to improve the properties of the sintered products an increase in the purity of the starting metal nitride and a reduction in the powder particle size of the metal nitride, from those of the metal nitride conventionally used, are required in the art.

The following four typical prior processes for producing metallic nitrides are known in the art.

(1) Direct nitridation methods, wherein the metal is heated at a high temperature in the presence of nitrogen or ammonia.

(2) Methods wherein the reduction and nitridation are simultaneously carried out by heating the mixture of the metallic oxide and carbon at a high temperature in the presence of nitrogen.

(3) Vapor phase reaction methods, wherein mixtures of the gaseous metallic halide and gaseous ammonia diluted with nitrogen are reacted at a high temperature.

(4) Thermal decomposition methods of the amides or imides, wherein the metallic halide and liquid ammonia are reacted with each other at an ambient or lower temperature and, then, the resulting metallic amides or imides are heated at a high temperature in an atmosphere of nitrogen or ammonia after they are separated from the reaction mixture (See: Powder Metallurgy International 6, No. 3, p144 (1974)).

However, the above mentioned prior art processes have several disadvantages from the standpoint of obtaining the desired metallic nitride fine powders having a high purity. Although the above-mentioned method (1) is industrially used at the present time, the purity and the particle size of the product directly depend upon those of the starting metal, so that the manufacture of fine metallic powder having high purity is first required. In the above-mentioned method (2) use of the fine metallic oxide powder having a high purity is also required, as in the method (1), and further, free carbon and metallic carbide are likely to contaminate the product. According to the above-mentioned method (3), although a metallic halide having high purity can be prepared, because the metallic halide is easily and highly purified by means of distillation and sublimation techniques, there are problems in that, since a very diluted gas-phase reaction is used, the productivity is low, and the yield of powders is low due to the deposition of the resultant nitride on, for example, the wall surface of the reaction tube. For this reason, this method is suitable for use in the surface coating of a metal, rather than the production of the nitride powder.

According to the above-mentioned method (4), the starting metallic halide can be easily purified, the productivity is high due to the liquid-phase reaction and a product having a powder particle size of the order of a micron or less can be obtained. Thus, this method seems to be suitable for use in the mass-production of fine metallic nitride powder having a high purity. However, since the reaction of the metallic halide with the liquid ammonia is a very vigorous exothermic reaction and a large amount of ammonium halide in the form of fumes is formed as a by-product, reaction control is very difficult, and plugging and other various problems are caused by the deposition of the ammonium halide by-product on the inner surface of the reactor, the supply nozzles of the starting materials and the tube wall of the gas outlet. For these reasons, this method has not been considered practical for use in industry.

An object of the present invention is to obviate the above-mentioned problems of the prior method (4) and to provide a process for producing a fine metallic nitride powder having high purity, without causing any plugging and other various problems in the reaction apparatus, and which process facilitates the heat control of the reaction.

Other objects and advantages of the present invention will be apparent from the following description.

In accrdance with the present invention, there is provided a process for producing metallic nitride powder comprising the steps of reacting a metallic halide with liquid ammonia to form a metallic amide or metallic imide, separating the resulting metallic amide or metallic imide from the reaction mixture and thermally decomposing the separated product in an atmosphere of nitrogen or ammonia to produce metallic nitride powder, wherein (i) the reaction is carried out in the presence of an organic solvent having a specific gravity higher than that of the liquid ammonia, said organic solvent and the liquid ammonia being not miscible or only slightly miscible with each other at reaction temperature, and (ii) the metal halide is allowed to react with the liquid ammonia by introducing the same into the lower organic solvent layer of the reaction system, which separates into two layers of the upper liquid ammonia layer and the lower organic solvent layer due to the difference of the specific gravities.

According to the present invention, the metallic halide introduced into the organic solvent layer diffuses into the organic solvent and very small amounts thereof react with the trace ammounts of ammonia which are dissolved in the organic solvent. Most of the metallic halide reaches the interface of the two layers and reacts with the liquid ammonia of the upper layer, to thereby deposit the metallic amide or imide at the interface of the two layers. Since the ammonium halide which is formed as a by-product is absorbed into the upper liquid ammonia layer, ammonium halide in the form of fumes is not generated. Therefore, no plugging is caused by the deposition of the products on the inner wall of the reaction apparatus or the inlets and outlets of the reaction apparatus. Furthermore, the reaction heat may be consumed by the vaporization heat of the excess liquid ammonia which is present as the upper layer.

The metallic halides employed in the present invention include those which react with liquid ammonia to form metallic amides or imides. Examples of such metallic halides are metallic halides derived from a metal selected from Groups III, IV and V of the periodic table of elements, such as, for example, $SiCl_4$, $BCl_3$, $TiCl_4$, $VCl_4$, $SiBr_4$, $TiBr_4$, $GeCl_4$, $HSiCl_3$, $H_2SiCl_2$ and the like. However, $AlCl_3$ reacts with liquid ammonia to form only the ammonia adduct thereof and this adduct does not produce nitride by the thermal decomposition thereof.

The metallic halide employed in the present invention is generally used in the form of a solution in which the metallic halide is dissolved in an organic solvent. Although the concentration of the solution in which the metallic halide is dissolved is not critical, it is preferable to use the metallic halide in an organic solvent solution having a concentration of from 5 to 50% by weight. When the metallic halide is in the liquid state at a reaction temperature, it can be used as it is.

The organic solvents employed in the present invention include those which are inactive against the liquid ammonia and the metallic halide, and which are not miscible or only slightly miscible in liquid ammonia at the reaction temperature, and also, dissolve only very small amounts of liquid ammonia at the reaction temperature, and further, which have a specific gravity higher than that of liquid ammonia. Although the solubility of liquid ammonia in the organic solvent at a reaction temperature is preferably 1% by weight or less, an organic solvent having a liquid ammonia solubility of more than 1% by weight can be used in the present invention in an unsaturated non-equilibrium condition. This condition can be attained, for example, by blowing nitrogen into the organic solvent layer, prior to the reaction (i.e. the introduction of the metallic halide), to thereby release the dissolved ammonia from the organic solvent layer.

Examples of the organic solvents which are preferably employed in the present invention are aliphatic hydrocarbons having 5 to 7 carbon atoms, such as n-pentane, n-hexane, n-heptane, and the like; alicyclic hydrocarbons, such as cyclohexane, cyclooctane and the like; aromatic hydrocarbons, such as benzene, toluene, xylene and the like, and; any mixture thereof. For instance, the ammonia solublity of a 4:1 mixture of cyclohexane and bezene is approximately 1% by weight at 0° C. and approximately 0.1% by weight at $-10°$ C.

Since the ammonia must be used in the liquid state in the present invention, it is used at a temperature of $-35°$ C. or less under atmospheric pressure, while it is used under pressure at ambient temperature.

The metallic amides or metallic imides formed in the liquid-phase reaction are likely to be oxidized or hydrolyzed. For this reason, in order to obtain the desired product having high purity, it is necessary to sufficiently remove water contained in the starting materials and, also, to carry out the reaction operation in an atmosphere of nitrogen, ammonia or other inert gases.

The reaction of the metallic halide with liquid ammonia should be carried out under such temperature and pressure conditions that the liquid ammonia and the organic solvent are not miscible with each other, and can coexist as two separate liquid layers due to their different specific gravities. The reaction temperature is, therefore, appropriately determined depending upon the varieties of the metallic halides and the organic solvents to be used. The preferable reaction temperature is within the range of from approximately $-80°$ C. to ambient temperature, provided that the reaction pressure is more than the vapor pressure of the ammonia in the case where the reaction temperature is equal to or higher than the boiling point of ammonia.

Although the reaction ratio of the metallic halide to liquid ammonia is not critical, it is preferable that the amount of liquid ammonia is more than ten times of that of metallic halide in mole ratio.

The process according to the present invention will be illustrated in detail with reference to the accompanying drawing, which is a schematic drawing illustrating one embodiment of the apparatus suitable for use in the experimental practice of the present process. Although the experimental arrangement illustrated in the drawing is adapted to be used for a low temperature, atmospheric pressure reaction, it should be noted that a similar apparatus made of pressure resisting materials can be used for the reaction carried out at ambient temperature under high pressure.

Liquid ammonia 3 and an organic solvent 4 are charged, via a feed pipe 2, into a reaction vessel 1, which is cooled by a coolant or regrigerant (not illustrated). Then, nitrogen gas is for some time bubbled through the pipe 2, whereby the atmosphere of the reaction system is replaced with nitrogen.

A metallic halide solution previously prepared in a vessel 5 is introduced, via the feed pipe 2, into the lower portion of the organic solvent layer 4. The metallic halide solution reaches the interface of the two layers and, then, metallic amide or imide is precipitated. During the introduction of the metallic halide solution, an agitator 6, which is installed in the reaction vessel 1, is slowly rotated. After the completion of the addition of the metallic halide solution, nitrogen gas is passed through the contents of the reaction vessel 1, while the agitator 6 is vigorously rotated.

After the completion of the reaction, valves installed in the line 2 and a line 7 are closed and a valve installed in line 8 is opened. Thus, by raising the temperature of the reaction vessel and by cooling a calcination tube 9, the reaction mixture in slurry contained in the reaction vessel 1 is transported into the calcination tube 9. This transfer is naturally caused by the vapor pressure difference of the ammonia between the reaction vessel 1 and the calcination tube 9. However, the transfer can also be effected by applying nitrogen pressure to the reaction vessel 1 via the line 2. From the slurry contained in the calcination tube 9, liquid is withdrawn out of the system through a pipe 11 having, for example, a ball filter 10, made of pyrex glass or the like, at the bottom thereof. In order to remove the ammonium halide residue from the resultant solids in the calcination tube 9, the resultant solids are washed with fresh liquid ammonia (which is supplied through the lines 2 and 8) and filtered several times.

After washing and filtration, the pipe 11 provided with the ball filter 10 at the bottom thereof is drawn up to the upper portion of the calcination tube 9 and then hot nitrogen gas is fed, via the pipes 2 and 8, to thereby dry the contents of the calcination tube 9.

The calcination tube 9 containing the resultant metallic amide or imide is inserted in an electric furnace (not illustrated) and, then, heated at a temperature of, for example, from 600° to 1000° C. (although this temperature may vary depending upon the types of the metallic amides or imides), while nitrogen or ammonia gas is purged. Thus, the metallic amide or imide is thermally or pyrolytically decomposed to form amorphous or crystalline metallic nitride.

The powders so obtained are taken from the calcination tube 9 and placed in a crucible made of aluminous porcelain (not illustrated). The crucible containing metallic nitride powders is baked at a temperature of, for example, from 1200° to 1600° C., in a tubular electronic furnace provided with an alumina core pipe (not illustrated), while nitrogen gas is purged. Thus, fine metallic nitride powders having high purity and high crystallinity can be satisfactorily obtained.

The calcination step and the baking step can be simultaneously carried out as long as the material from which the vessel (or tube) is made can be subjected to such operating conditions without damage. In addition, the baking step may be omitted depending upon the use of the metallic nitride.

In the drawing, the reference numeral 12 indicates a condenser which is cooled with dry ice and which refluxes the ammonia vaporized from the reaction vessel 1.

The present invention now will be further illustrated by, but by no means limited to, the following Examples, in which all parts and percentages are expressed on a weight basis unless otherwise noted. The reaction apparatus and operation procedure conforming to the above description are used in the following Examples.

EXAMPLE 1

Into a 500 ml reaction vessel 1 cooled to a temperature of −40° C., about 100 ml of liquid ammonia and, as an organic solvent layer 4, about 50 ml of a 4:1 (by weight ratio) mixture of cyclohexane and benzene were charged, and the atmosphere in the reaction vessel was replaced by nitrogen gas by blowing nitrogen gas through pipe 2. Thereafter, a starting solution of 10.3 g of silicon tetrachloride and 40 ml of said organic solvent mixture, which was previously prepared in vessel 5, was introduced through the pipe 2 into the bottom portion of the reaction vessel 1. As a result, the silicon tetrachloride was reacted with the liquid ammonia and the reaction mixture in slurry form was transported into a calcination tube 9 and filtered in the manner mentioned hereinabove with reference to the drawing. The filtered product was washed with liquid ammonia four times (the amount of the ammonia used was about 50 ml each time) and, then, dried by passing a hot nitrogen gas therethrough.

The calcination tube 9 containing the product was, then, inserted into a tubular electric furnace and heated at a temperature of 1000° C., for 3 hours, while gaseous ammonia was purged inside of the tube 9. The resultant powders in the tube were taken out from the tube and placed in an alumina crucible. The powders contained in the crucible were baked at a temperature of 1550° C., for 5 hours, in an electric furnace ("KERAMAX" made from Nippon Kagaku Kogyo Co., Ltd. provided with an alumina core pipe, while nitrogen gas was purged. As a result, 2.72 g of off-white powder were obtained. The X-ray diffraction analysis of this powder showed only the presence of α-silicon nitride (α-Si$_3$N$_4$) and 10% or less of β-silicon nitride.

The yield of the silicon nitride based on the starting silicon tetrachloride was 96%.

The nitrogen content of the powder according to alkali fusion analysis was 39.2% (the theoretical value in terms of Si$_3$N$_4$ was 39.9%). By using a scanning type electron microscope, hexagonal cylindrical particulates, having a diameter of 1 micron and a height of 1 micron, needle particulates, having a diameter of 0.5 micron and a length of 10 through 20 microns, and fine particulates having a diameter of 0.01 through 0.1 micron, were observed.

In addition, when the contents of the impurities contained in the product were measured by X-ray fluorescence analysis, only 10 ppm or less of each of K, Ca, Al, Fe and Cu, and 100 ppm or less of Cl were detected.

EXAMPLE 2

The liquid-phase reaction was carried out in the reaction vessel 1 in a manner similar to that described in Example 1, except that a solution of 16.5 g titanium tetrachloride in 40 ml of toluene was used as the starting material, toluene was used as the organic solvent and the temperature of the reaction vessel was −60° C. The reaction products were transported into the calcination tube 9 and, after washing and drying, heated at a temperature of 1025° C., for 3 hours, while gaseous ammonia was passed therethrough. Thin golden films were deposited on the inner surface of the calcination tube. 4.91 g of black and brown powder were obtained at the bottom of the calcination tube. The yield of the titanium nitride based on the starting titanium tetrachloride was 91%.

As a result of X-ray diffraction analysis of the product, it was confirmed that cubic titanium nitride was obtained. The nitrogen content of the product was 21.7% (the theoretical value in the terms of TiN was 22.6%). Observation through an electron microscope showed that fine particulates having a diameter of approximately 0.01 through 0.1 micron were obtained.

EXAMPLE 3

The liquid-phase reaction was carried out in the reaction vessel 1 in a similar manner to that described in Example 1, except that a solution of 17.0 g of boron trichloride in 40 ml of n-hexane was used as the starting solution, a 1:2 mixture (by weight ratio) of n-hexane and toluene was used as the organic solvent and the temperature of the reaction vessel 1 was −60° C. The reaction products were transported into the calcination tube 9 and, after washing and drying, were heated at a temperature of 1000° C. for 3 hours, while nitrogen gas was used as purge. The product thus obtained was then baked at a temperature of 1550° C., for 5 hours, in an electric furnace, while nitrogen gas was used as purge. 3.52 g of pure white powder were obtained. X-ray diffraction analysis showed that the product was hexagonal boron nitride (BN). The yield of the boron nitride based on the starting boron trichloride was 98%. The nitrogen content of the product was 54.9% (the theoretical value in terms of BN was 56.4%). Fine particulates having a diameter of approximately 0.1 micron were observed by an electron microscope.

EXAMPLE 4

The liquid-phase reaction was carried out in the reaction vessel 1 in a similar manner to that described in Example 1, except that a solution of 12.0 g of vanadium tetrachloride in 40 ml of n-heptane was used as the starting material, a 1:2 mixture (by weight ratio) of n-heptane and toluene was used as the organic solvent, and the temperature of the reaction vessel 1 was −60° C. The reaction products were transported into the calcination tube 9 and, after washing and drying, were heated at a temperature of 1000° C. for 3 hours under a gaseous ammonia stream. The product thus obtained was further baked at a temperature of 1500° C. for 1 hour.

3.82 g of brown powder, which was determined to be cubic vanadium nitride (VN) by X-ray diffraction analysis, were obtained. The yield of the product based on the starting vanadium tetrachloride was 94%. The nitrogen content was 19.2% (the theoretical value in terms of VN was 21.6%). Fine particulates having a diameter of 0.01 through 0.1 micron were observed by an electron microscope.

EXAMPLE 5

The liquid-phase reaction was carried out in the reaction vessel 1 in a similar manner to that described in Example 1, except that a solution of 12.8 g of silicon tetrabromide in 10 ml of toluene was used as the starting material, toluene was used as the organic solvent and the temperature of the reaction vessel 1 was −35° C. The products thus obtained were transported into the calcination tube 9 and, after washing and drying, heated at a temperature of 1000° C., for 3 hours, in a gaseous ammonia stream. The product was further baked at a temperature of 1550° C., for 5 hours, in an electric furnace, while nitrogen gas was purged.

1.68 g of off-white powder, which was determined to be α-silicon nitride containing 10% or less of β-silicon nitride therein by X-ray diffraction analysis, were obtained. The yield of the product based on the starting silicon tetrabromide was 98%. The nitrogen content was 38.9% (the theoretical value in terms of $Si_3N_4$ was 39.9%). Results similar to those of Example 1 were observed through an electron microscope.

EXAMPLE 6

The liquid-phase reaction was carried out in the reaction vessel 1 in a similar manner to that described in Example 1, except that a solution of 13.6 g of trichlorosilane in 10 ml of toluene was used as the starting material, toluene was used as the organic solvent and the temperature of the reaction vessel 1 was −40° C. The products thus obtained were transported into the calcination tube 9 and, after washing and drying, were heated at a temperature of 1000° C. for 3 hours in a gaseous ammonia stream. The product was further baked at a temperature of 1550° C., for 5 hours, in an electric furnace, while nitrogen gas was purged.

3.35 g of off-white powder, which was determined to be α-silicon nitride containing 10% or less of β-silicon nitride therein by X-ray diffraction analysis, were obtained. The yield of the product based on the starting trichlorosilane was 72%. The nitrogen content was 39.3% (the theoretical value in terms of $Si_3N_4$ was 39.9%). Results similar to those of Example 1 were observed through an electron microscope.

EXAMPLE 7

Into a 5 liter reaction vessel provided with a cooling jacket made of pressure resistant glass (usual operating pressure: 10 kg/cm$^2$), 1 liter of liquid ammonia (as the upper layer) and 1 liter of a 4:1 mixed solvent (by weight ratio) of cyclohexane and benzene (as the lower layer) were charged and cooled to a temperature of 5° C. After the atmosphere in the reaction vessel was replaced by nitrogen, a mixed solution of 200 g of silicon tetrachloride and 1 liter of the above mentioned mixed solvent, which was separately prepared, were introduced into the mixed solvent of the lower portion of the reaction vessel by a supply pump. As a result, the reaction occurred in the liquid phase. A white powder which was formed was filtered off and washed with liquid ammonia. The powder so obtained was heated at a temperature of 1000° C., for 3 hours, under a gaseous ammonia stream and, further, was baked at a temperature of 1550° C., for 5 hours, in a nitrogen gas stream. As a result, about 52 g of greyish white powders were obtained (yield: 95%). The nitrogen analytical value of the product was 39.0% (the theoretical value in terms of $Si_3N_4$ was 39.9%). It was found that the product contained α-silicon nitride, including 10% or less of β-silicon nitride therein, as a result of X-ray diffraction analysis.

COMPARATIVE EXAMPLE

Into the reaction vessel 1 cooled to a temperature of −40° C., only about 100 ml of liquid ammonia was charged, and then a starting solution of 9.8 g of silicon tetrachloride in 40 ml of a 4:1 mixed solvent (by weight ratio) of cyclohexane and benzene was fed, through the pipe 2, int the bottom portion of the reaction vessel 1. As soon as the starting material began to be added dropwise through the pipe 2, white solids formed simultaneously, with fumes being generated. As a result, the inside of the supply pipe 2 for the starting material was plugged, so that further addition was not possible.

As described above, according to the present invention, since fine metallic nitride powders having high purity which are especially useful for the manufacture of super hard heat resisting materials can be produced with high yield, the present invention has provided a significant advance in the technology relating to super high temperature apparatus such as rockets, missiles, plasma jets and the like; nuclear industries; chemical industries involving the handling of high temperature gases, and; the like.

What we claim is:

1. In a process for producing metallic nitride powder wherein a metallic halide is reacted with liquid ammonia to form a metallic amide or metallic imide, the resulting metallic amide or metallic imide is separated from the reaction mixture and the separated product is thermally decomposed in an atmosphere of nitrogen or ammonia to produce metallic nitride powder, the improvement which comprises carrying out the reaction in the presence of an organic solvent having a specific gravity higher than that of the liquid ammonia, said organic solvent and the liquid ammonia being not soluble or only slightly soluble with each other at the reaction temperature employed, by first charging liquid ammonia and the organic solvent into a reaction vesel with the organic solvent and liquid ammonia separating into two layers; an upper liquid ammonia layer and a lower organic solvent layer, and then introducing the metallic halide into the lower organic solvent layer; the so introduced metallic halide diffusing through the organic solvent layer and reacting with the liquid ammonia at the interface of the two layers to deposit metallic amide or metallic imide at said interface and form ammonium chloride which is absorbed into the liquid ammonia layer.

2. A process as claimed in claim 1, wherein said metallic halide is derived from a metal selected from Groups III, IV and V of the periodic table of elements.

3. A process as claimed in claim 2, wherein said metallic halide is selected from the group consisting of $SiCl_4$, $BCl_3$, $TiCl_4$, $VCl_4$, $SiBr_4$, $TiBr_4$, $GeCl_4$, $HSiCl_3$ and $H_2SiCl_2$.

4. A process as claimed in claim 1, wherein said organic solvent is selected from the group consisting of n-pentane, n-hexane, n-heptane, cyclohexane, cyclooctane, benzene, toluene, xylene and any mixtures thereof.

5. A process as claimed in claim 1, wherein the reaction temperature of the metallic halide and the liquid ammonia is within the range of from −80° C. to ambient temperature.

* * * * *